Oct. 8, 1963 J. H. LEMELSON 3,106,612

MAGNETIC RECORDING SYSTEM

Filed Sept. 23, 1957 4 Sheets-Sheet 1

INVENTOR.
Jerome H. Lemelson
BY Ostrolenk, Faber, Gerb & Soffen

INVENTOR.
Jerome H. Lemelson
BY Ostrolenk, Faber, Gerb & Soffen

INVENTOR.
JEROME H. LEMELSON
BY Ostrolenk, Faber, Gerb & Soffen

INVENTOR.
JEROME H. LEMELSON
BY Ostrolenk, Faber, Gerb & Soffen

United States Patent Office 3,106,612
Patented Oct. 8, 1963

3,106,612

MAGNETIC RECORDING SYSTEM

Jerome H. Lemelson, Box 468, Metuchen, N.J.

Filed Sept. 23, 1957, Ser. No. 685,692
14 Claims. (Cl. 179—6)

This invention relates to magnetic recording and reproduction apparatus and is a continuation-in-part of my application Serial Number 515,417, now Patent No. 3,003,109, entitled Computing Apparatus, and filed on June 14, 1955.

Among the objects of this invention is the provision of improved means for effecting automatic magnetic recording on and reproduction from one or more of a plurality of magnetic recording tracks provided on one or more magnetic recording members in a magnetic recording device.

Another object is to provide improved magnetic recording and reproduction apparatus having novel and simple means for selectively recording and reproducing from one or more of a plurality of recording channels of one or more magnetic recording members.

Still another object is to provide magnetic recording and reproduction apparatus including magnetic recording means having a plurality of magnetic recording channels including means for automatically conditioning selected of said recording channels for recording and recording selected signals thereon.

A further object is to provide an improved magnetic recording and reproduction apparatus having a recording medium with multiple channels and operative for use in coin operated juke boxes and the like and also having means for automatically transcribing predetermined messages or signals of selected musical compositions therein without the need for human attendance or manual control of said recording.

Another object is to provide improved magnetic recording and reproduction apparatus having means for recording multiple signals such as recordings of different pieces of music on predetermined recording areas of said recording means and means for reproducing selected of said signals, said apparatus also including means for remotely transcribing selected signals on said recording means thereby eliminating the need for transporting transscribing apparatus and eliminating the current practice of physically replacing multiple recording mediums.

Still another object is to provide sound recording and reproduction apparatus including a transcription system which is automatically connectable or capable of being automatically coupled thereto for automatically transcribing selected signals on predetermined recording areas of an erasable recording medium of said apparatus from a remote location over common carrier means such as telephone lines or by short wave at any convenient time such as at night when the load on said carrier means is lowest and noise due to operation and other phenomena is at a minimum.

Yet another object is to provide selectively operated record playback apparatus, such as a coin operated juke box, with a system for automatic and remote transcription on a recording medium of said apparatus, whereby recordings may be easily kept up to date, or changed on short notice without the need of an attendant at the apparatus to effect said changing.

Other objects and advantages of the invention will be apparent from the following description reference being made to the accompanying drawings wherein.

Figures 1, 2:
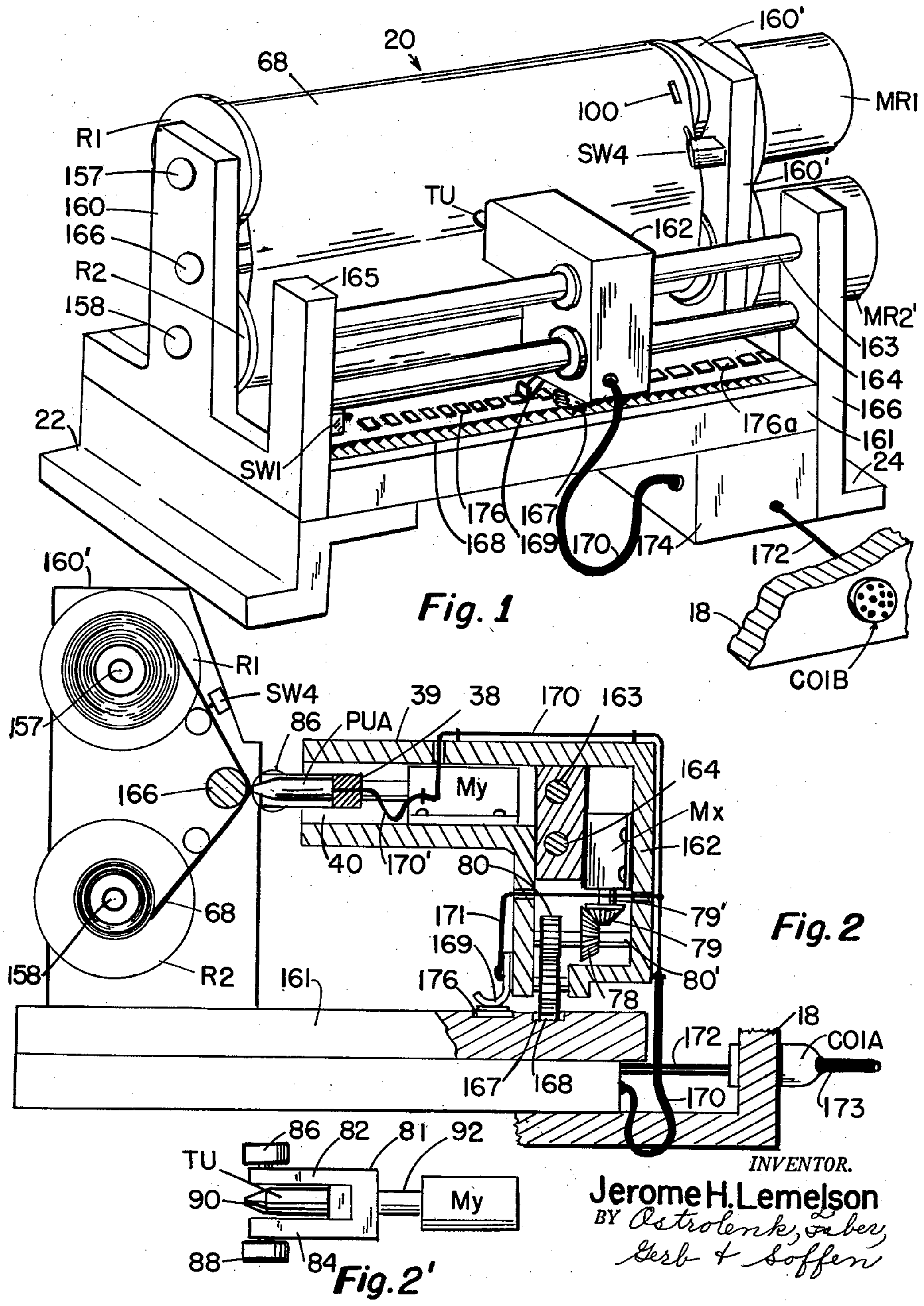
FIG. 1 is an isometric view of a magnetic recording and reproduction device which may be utilized as a component of the invention.
FIG. 2 is a section taken on broken line 2—2 of FIG. 1 showing further details of the unit of FIG. 1.

FIG. 2′ is a plan view of a modified transducer head and mount which is applicable to the apparatus of FIGS. 1 and 2.

Figures 3, 4, 6:
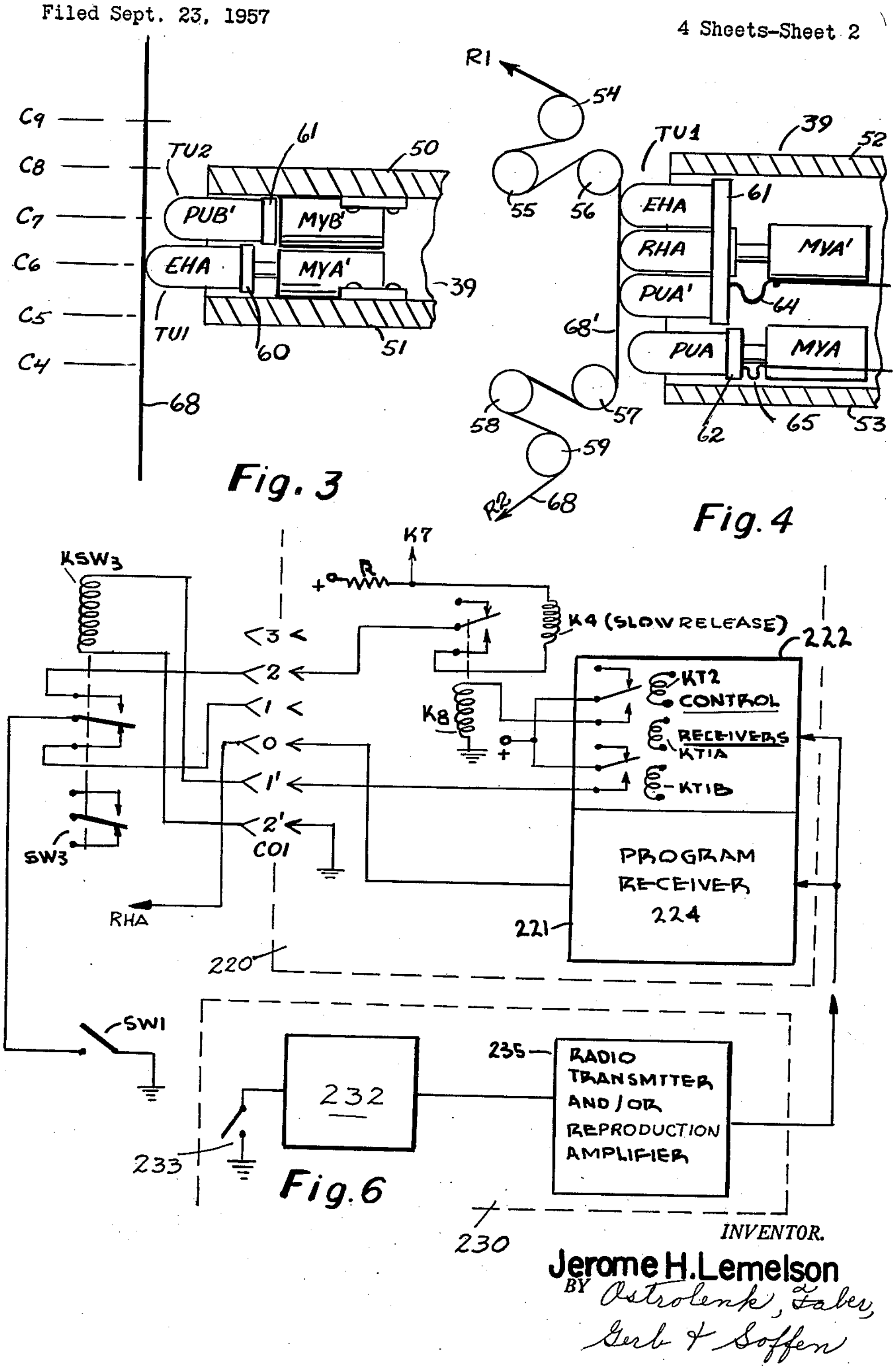

FIG. 3 is a partly sectioned plan view of magnetic transducing means applicable to the device of FIGS. 1 and 2.

FIG. 4 is a partly sectioned side view of the apparatus of FIG. 3.

FIG. 4′ is a partly sectioned view of a modified magnetic transducing means applicable to the device of FIGS. 1 and 2.

Figure 5:
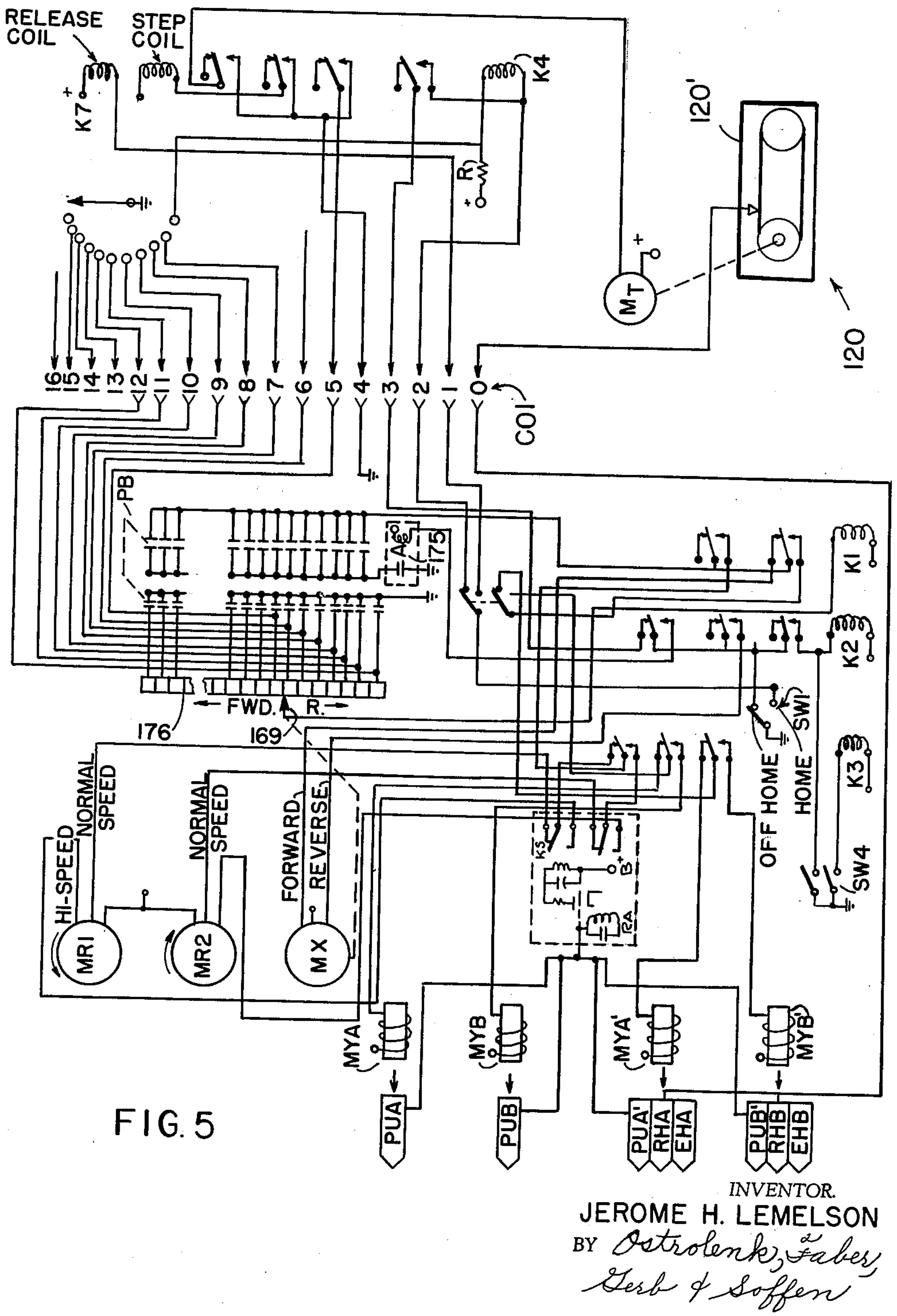

FIG. 5 shows schematically a typical electrical circuit for controlling the apparatus of FIGS. 1 to 4.

FIG. 6 shows schematically modified control means for the circuit of FIG. 3 permitting remote conditioning of the recording medium of the apparatus of FIGS. 1 and 2 and controlled transcription thereon from a remote location.

Figures 4, 7:
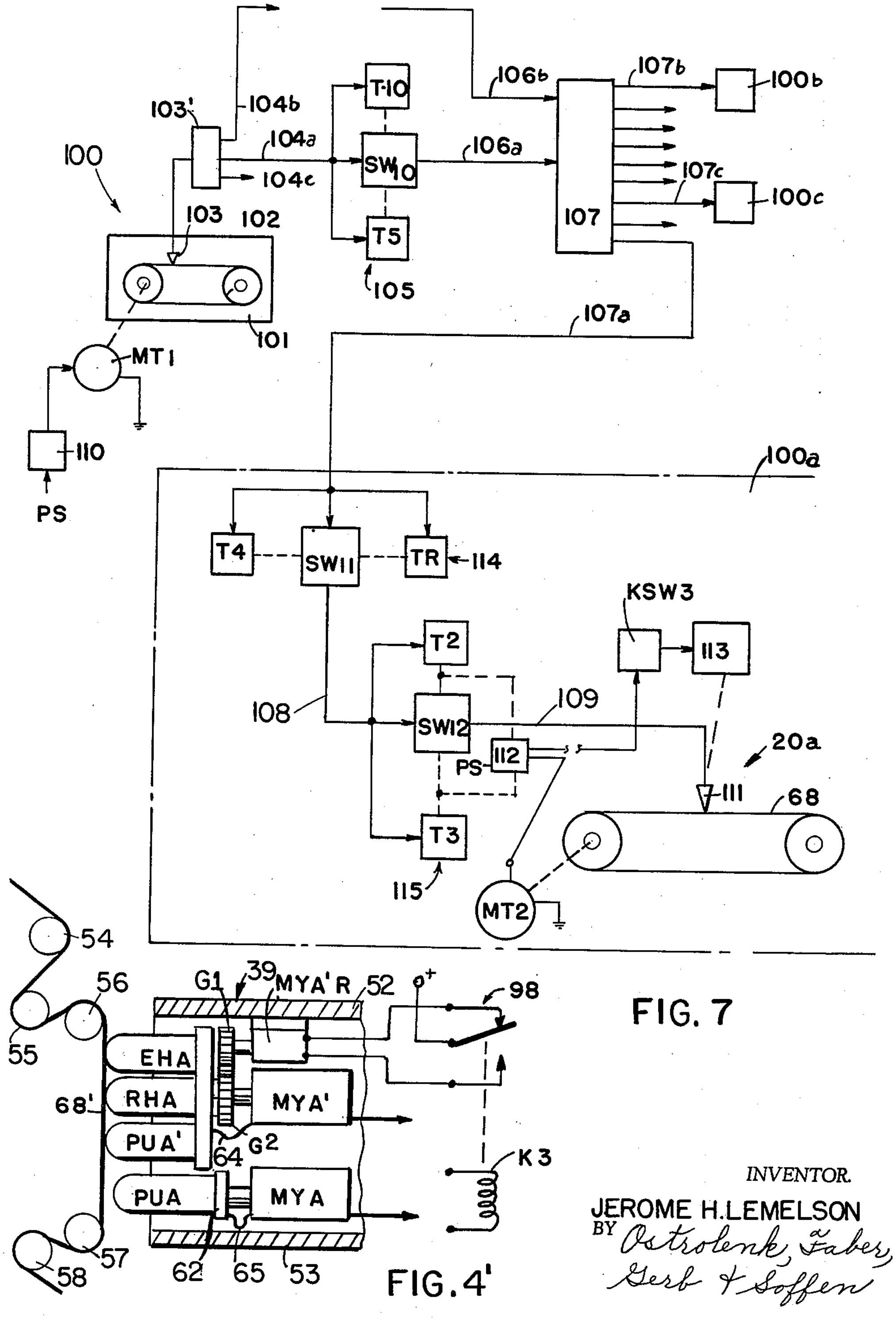

FIG. 7 is a block diagram showing further details of FIG. 6 and of apparatus for automatically communicating between recording and reproduction apparatus in general.

Currently utilized devices for selective playback of recorded music, including coin operated juke boxes employ multiple plastic discs or records and manual selection means for sound reproduction from a predetermined of said records. A prime disadvantage in utilizing a disc type of recording medium is that the discs must be physically replaced when it is desired to change the recording. Whenever a new recording is desired to be added to or to replace a recording in the selective record player, a new record must be cut, physically transported to the machine, and inserted after the removal of the old record. The procedure is costly from a labor and material standpoint and frequently results in the maintaining of worn, old or unpopular recordings in the machine for an extended period of time resulting in a loss of possible revenue. When a particular recording is quite popular, the record due to repeated playings is rapidly worn out also resulting in loss of revenue due to misuse.

In general this invention contemplates apparatus for recording and reproducing record signals which may be utilized in juke boxes and the like wherein substantial monetary and labor savings may be effected not only in the production of said apparatus over the conventional relative complex record player employing plastic disc recordings, but over the years after its installation in maintenance and in the procedure of changing recordings. Control apparatus is also provided in a simple form for changing or adding new recordings to the reproduction apparatus as they are composed or shortly thereafter with a minimum of effort and without the need to physically visit the location of the record machine.

In FIG. 1 there is shown a compact magnetic recording and reproduction unit 20 having means for recording on and reproducing from a selected recording track of a plurality of recording tracks provided on a relatively wide flexible magnetic recording tape or band 68 which is driven from one of two reels R–1 and R–2 to the other. The reels or spools R–1 and R–2 are provided with axles or shafts 157 and 158 which are rotationally supported by bearing means secured to end uprights 160 and 160′ extending from a rigid platen or base 161. The base 161 is supported on brackets 22 and 24 which are secured to a chassis or the shelf of a juke box housing 18 partly shown. The platen 161 also supports a pair of uprights 165 and 166 which support a pair of parallel cylindrical rods 163 and 164 which serve as a track for guiding a carriage 162 mounting a transducing unit TU having magnetic recording and reproduction heads which are projectable from retracted positions on said carriage 162 to engage or be positioned a short distance off said tape 68 for transducing thereto or therefrom. The carriage 162 is driven by a reversible electric motor MX mounted therein, and shown in the partly sectioned view of FIG. 2, to travel parallel to the surface of the tape 68. A gear or toothed wheel 167, rotated by motor MX thru a gear train comprising gears 78, 79, 80 and 81 is supported in bearing by the sidewalls of the housing 162 and is adapted to engage the teeth of a flat spur gear 168 which is cut in or provided on the platen 161 and extends parallel to the carriage track a sufficient distance to permit the desired travel of 162 under the power of motor MX. The numerals 79′ and 80′ refer to shafts for the gears 79 and 80 supported in bearing by the walls of the carriage housing. The carriage 162 is provided with a projecting section 39 having an open bore 40 in which is movably mounted one or more transducing units on a base 38 in addition to other recording and reproduction transducers to be described.

The unit 38 is driven from a retracted position in the bore 40 to the projected position shown in FIG. 2 whereby the transducing head is touching or positioned less than a thousandth of an inch off the tape 68, by a lineal motor solenoid MY secured in 39. Said solenoid is a bistable push-pull device which projects the head mount 38 against the tape 68 or closely adjacent thereto when energized.

A flexible harness 170′ of electrical cable extends from transducer housing 38 and is provided with sufficient slack to permit motion of 38 from said retracted to said extended position. The harness 170′ contains conductors for signal input to and output from the magnetic transducer heads provided in TU. The cable or harness 170 extends from the carriage 162 to a housing 174 under the base 161 which contains input connection means CO1B and/or amplifying and control circuit components. Sufficient slack is provided in the cable 170 to permit motion of the carriage along its track between uprights 165 and 166.

The numeral 176 refers to a selection track of multiple short length conducting strip contactors 176*a* secured adjacent track 168 which extend as a train and are insulatedly mounted apart and off base plate 161. The individual contactor elements 176*a* are adapted to be swept by an electrical brush or sensor 169 which is insulatedly mounted on housing 162. Wires (not shown) extend from each surface conductor 176*a* to a rotary selection switch K7 (illustrated in FIG. 5) for selection of a predetermined channel on 68 for transducing from or to by positional control of the carriage 162 when a circuit is grounded as the sensor 169 sweeps over the surface elements 176. The numeral 171 refers to an insulated conductor extending from 169 to the harness cable 170 which it joins and extends therein to the externally mounted control circuitry in or beyond housing 18.

Drive units MR1′ and MR2′ containing motors MR1 and MR2 and the necessary gearing and motor speed controls are shown mounted on the upright 160′ with the shafts of the drive motors therein coupled to shafts 157 and 158 for rotating either drum R1 or R2 to wind-up the tape 168 from the other in motion past the transducing unit or heads. A first means for precisely positioning the tape 68 relative the transducing head PU comprises a cylindrical rod 166 extending between and supported by uprights 160 and 160′ over which said tape 68 is driven. Since 166 is fixed relative to the track for guiding carriage 162, if tape 68 is maintained in surface contact with 166 the recording surface thereof will be fixed relative to the transducing head PU when in either of its bi-stable positions and the latter may be adjustably positioned to just touch or be a short predetermined distance off 68 when projected by MY.

If the thickness of tape 68 is precisely maintained along its length and it is drawn taut without stretching against 166 during its forward or reverse motion by the provision of conventional tape tensioning means in the drive means for said belt 68, and if the guides and bearings for carriage 162 are precisely made and mounted such that the transducing head or heads of unit TU remain a fixed distance away from said tape where it is drawn against 166, then said transducer(s) may be rigidly affixed to 39 such that the tip of each transducer is positioned the required short distance off 68 for transducing (usually less than .001 inch) during the movement of carriage 162 along its entire length of travel. As a result, the servo MY for advancing the transducer against or close to the tape 68 would be eliminated and the control means to be described would be simplified by the elimination of the transducer projecting servos MY and movable mount therefor.

If 166 is made of a fluorocarbon resin or is coated therewith, friction on the rear surface of tape 68 will be minimized.

FIG. 2′ is a plan view of a modified transducing head mounting for precisely positioning said head end a fixed distance off tape 68 for transducing thereto and/or therefrom. The transducer head TU is mounted on the base of a yoke 81 and extends between the arms 82 and 84 of said yoke as shown whereby the nose 90 of the transducer (containing the conventional magnetization gap or gaps) projects from the end of said yoke. Small wheels 86 and 88 are rotationally mounted on the arms 82 and 84 and are adapted to engage the tape 68 against 166 when MY projects assembly 80 mounted on shaft 92. The wheels, abutting the tape and backing rod or roller 166 thus preposition 90 relative to tape 68. If the transducer head is mounted so that its nose 90 is positioned close (½ mil or so) to the surface of tape 68 when the latter is drawn over 166 and when the solenoid MY is fully projected and the free play in the bearings for the wheels 86 and 88 is fully taken up as they bear against said tape backed up by 165 as in FIG. 2, then the tape 68 will be contacted only by the rolling wheels and will not be worn or scratched by the action of said stationary head 90 bearing thereagainst.

FIGS. 3 and 4 show variations in the tape guidance and magnetic transducing means of FIGS. 1 and 2 for permitting automatic transcribing functions to be performed on the recording medium of said magnetic recording apparatus or similar apparatus.

In the modified transducing head design of FIGS. 3 and 4, eight transducing heads are movably mounted in the housing 39 and are projectable therefrom by four solenoids which are secured to the side walls 50 and 51 of housing 39. Positioned adjacent the top 52 of housing 39 are two groups of three magnetic heads each referred to by the notations TU1 and TU2. The heads of group TU1 are in vertical alignment on a common base mount 61 and are simultaneously projected by a solenoid MYA′. Said heads comprise an erase head EHA, a recording head RHA and a reproduction head PUA′ and are utilized for providing new recordings on selected even channels C2, C4, C6, C8, etc. of the tape 68 shown in the plan view of FIG. 3 as extending between odd channels C1, C3, C5, C7, etc. Said odd channels are adapted to sweep past and be transduced on by the magnetic heads of the transducer unit TU2. Each particular recording is thus provided in one direction on an odd channel and in the reverse direction on an adjacent even channel so that regardless of which end the tape had been previously driven, playback of the same recording or of any of the other recordings, which are selectively transduced therefrom, may be derived without rewinding said magnetic belt. The heads of unit TU2 are thus provided in the reverse order of those of the unit TU1. As the tape moves from reel R1 to R2 when the apparatus is controlled to effect transcription of a new recording on an even channel thereof, the erase head EHA is energized to erase the prior recording and noise therefrom, the recording head RHA transcribes the new signal on the erased channel and the third head PUA' reproduces the newly recorded signal for monitoring purposes.

Two reproduction heads PUA and PUB (only one of which, PUA' is illustrated in FIG. 4 the other being positioned behind PUA in said view) are respectively controlled to engage and retract from a free stretch 68' of belt 68 by separate solenoids MYA and MYB secured to sidewalls 50 and 51. Whereas the heads PUA' and PUB' may be utilized for selective playback as well as monitoring purposes, the auxiliary units PUA and PUB are provided to reduce the degree of wear on the surface of 68 caused when the three heads contact said tape. The numerals 64 and 65 refer to flexible conducting cable provided with sufficient slack length to electrically connect the movable heads of units TU and heads PU with the housing 39 wherefrom they extend thru harness 170 to control apparatus situated remotely therefrom which will be described.

The magnetic belt guiding means of FIGS. 1 and 2 has been modified in FIGS. 3 and 4 to provide a free stretch 68' of tape against which said heads may bear during reproduction as well as transcription functions. The free wheeling rollers 54 to 59 are supported in bearing by the uprights 160 and 160' of the device 20 of FIG. 1 and provide means for guiding said flexible magnetic recording member 68 in the path illustrated.

It is noted that one of said rollers 54 to 59 may coact with a drive roll for direct drive of 68 by conventional depressor-drive wheel means which includes frictional engagement of 68 between a powered roll and one of the rolls 54 to 59.

The device of FIGS. 1 and 2, or any similar multichannel magnetic recording device such as an array of narrower magnetic tapes or wires provided with a common drive means and providing multiple side by side recording channels in the manner of the wide belt or band 68 may be utilized as part of a compact juke box record playback device with the recordings or music record signals thereof capable of being changed or rejuvenated by automatic means either locally or from a remote transmission station. This will eliminate the need to replace recording units such as discs or reels of tape with a resulting labor and monetary saving in performing these operations and will save considerable time in effecting said record changing.

For effecting transcribing functions in the unit 20, a cable 172 is connected to multiple terminals in a female connector CO1B shown in FIG. 1 as being secured to a wall 18 of the juke box housing, which carries the multiple conducting wires therein to the housing 174 in which is located the various control and switching elements for controlling playback and recording functions to be described. A male plug or multi-pin connector CO1A is shown in FIG. 2 coupled with CO1B and extends multiple wires via cable 173 to respective circuit elements in 20 connecting thereto, control elements of an automatic transcribing unit to be described.

FIG. 4' shows a modified transducing unit for recording on and reproducing from the tape 68', which unlike the design of FIGS. 3 and 4, employs only a single bank of heads EHA (erase), RHA (record) and PUA' (reproduce during transcribing), and PUA (normal playback), the latter being projectable by a single solenoid and the former three performing the functions of the dual assemblies TU1 and TU2 of FIGS. 3 and 4. In order to provide the bank of three heads, which are mounted on a modified mount 61', in the reverse order when so needed during transcribing, said mount 61' is rotationally mounted on the shaft of the projection solenoid MYA' and is rotated thru 180 degrees by a bi-stable rotary solenoid MYA'R secured to 39 and driving 61' in rotary motion thru gears G1 and G2 or via a crank means. Since MYA'R is a bi-stable servo, each of its actuating inputs is shown connected to a bi-stable switch 98 which is part of the bank of switches actuated by the relay K3. Hence every time K3 is energized which occurs at the end of each travel of the tape, the heads TU1' of FIG. 4' will rotate 180 degrees so that they are in the proper order for transcribing.

The following identification of parts is presented to simplify the description of the control means illustrated 1 to 4 in automatic recording and monitoring and reproduction functions:

in FIGS. 5 and 6 for controlling the apparatus of FIGS.

MX—Reversible motor for driving carriage 162
176—Selection track along side of track 168
MXS—Selection sensor driven by MX along 176 (brush 169, FIG. 2.)
MR1—Motor for driving tape drum for odd channels
MR2—Motor for driving tape drum for even channels
PUA—Playback head for odd channels
PUB—Playback head for even channels
PUA'—Playback head for playback during transcribing on odd channels
PUB'—Playback head for playback during transcribing on even channels
RHA—Record head for transcribing on odd channels
EHA—Erase head for transcibing on odd channels
RHB—Record head for transcribing on even channels
EHB—Erase head for transcribing on odd channels
MYA—Solenoid for actuation of PUA
MYB—Solenoid for actuation of PUB
MYA'—Solenoid for actuation of PUA', RHA, EHA
MYB'—Solenoid for actuation of PUB', RHB, EHB
C—Coupling capacitors
RA—Reproduction amplifier which has in addition to normal voice amplification stage an additional stage with a slow operate relay for "end-tone" transfer to high speed playout
PB—Push button record selectors (part of 175), two normally open contacts for each push button, arranged so that only one may be depressed at a time
K1—Start relay, general purpose telephone type
K2—Stop relay, general purpose telephone type
K3—Odd-even transfer relay, bi-stable, stepping type
K4—Transcribe relay, slow release telephone type
K5—"End-tone" recognition relay, sensitive plate relay type, causes high speed play out
K6—Electro-magnetic device to release coin and open coin operated closure A
K7—Auto channel selector switch, minor switch
A—Coin operated closure for start of playback
R—Resistor for power supply protection at end of transcribing
CO1—Connector attachment of transcribing unit, multi-pin type
SW1—Carriage home switch (normally open monostable limit switch) actuated upon movement of the carriage 162 against upright 165
SW3—Transfer toggle switch to initiate automatic transcribing
SW4—End of record time-allowance switch, closes after a period of time from start of record equal to the time allowed for the longest recording when the actuator arm falls into slot 100 in the recording belt 68
MT—Transcriber motor, operates at same speed as MR1 and MR2 bi-speed, drives record medium of transcriber playback unit 120'
KSW3—Tone operative relay replacement for SW3 for remote transcribing
K8—"Begin-new-transcription" relay for remote transcribing 221—Control and program receivers for remote transcribing SW5—Manually operated "omit-transcribing" switches K9—"Step-to-next-channel" relay for local selective transcribing (2 pole switches to step over 2 channels at a time for odd and even)

175—Coin slot mechanism including closure switch "A" for start of selected playback 120—Transcriber unit for local transcribing record signals on recording medium of recording unit 20

220—Local transcriber unit attachment to recording unit 20 for remote transcribing, 230—Remote transcriber unit for remote transcribing consisting of a record signal reproducer or generator 232 and a transmitter or amplifier 234

The system shown in FIG. 5 provides for the selective playback of a recording or record signal from one of a multiple of recording channels on a belt such as belt 68 of FIGS. 1 to 4 or a multiple of aligned narrow tapes of equal length driven off a common shaft or shafts. The system is shown for the specific case of a coin operated "record" player having two recordings of each record on adjacent channels each to be played back or reproduced by the belt travelling past either of two playback heads in either the forward or reverse direction which in the unit 20 of FIGS. 1 and 2 is shown as either the up or down directions.

Also shown in FIG. 5 is part of an automatic transcribing unit which can be connected to said playback unit 20 for unattended transcribing of new recordings onto the magnetic recording belt 68.

OPERATION OF PLAYBACK UNIT

Consider the switch SW3 down for normal playback and the carriage 162 in the "home" position; therefore SW1 down and 169 home. Also, assume K3 as having been left in the position shown. Selection of a recording is made by depressing a push-button of the bank of selection switches PB and depositing a coin in the coin slot or receptacle. The coin causes a closure of "A" which provides a ground through contacts on K1 for the "forward" winding on MX. This causes MX to operate moving the carriage 162 along track 168 and moving 169 along the line of contactors 176 until it reaches the insulated segment to which the push-button switch selected is attached. Depressing the push-button switch had connected the track segment to ground. When 169 reaches this segment it connects this ground to K1 operating it and causing the ground through "A" to be disconnected from MX thus stopping MX and causing the ground to be applied through SW3 to solenoid MYA causing the reproduction head PUA to be projected forward against the selected belt recording channel. When K1 operates, the ground thru "A" is also applied to MR1 causing the belt drum to start revolving carrying the belt past reproducing head PUA.

The recording is picked up by PUA and amplified by the reproduction amplifier RA. An additional stage is added to RA which is frequency selective and has a slow operating relay in its plate circuit. To signify the end of a record playback cycle, a low level pulse of a single frequency tone to which the last stage of RA is responsive is transcribed on the magnetic belt after the end of the recording of the record signal or musical piece, for a duration of approximately one second. Upon receipt of this pulse, K5 operates and switches the tape driving motor (either MR1 or MR2 depending on which is in operation at the time) from normal to high speed to reach the end of the belt travel which is determined by the length of the longest recording. This is done to reduce the downtime between playback cycles which are selected to occur one after the other. When the belt is so run out, limit switch SW4 becomes energized as its arm or actuator rides in said cutout 160 in the tape 68 and causes K2 and K3 to operate. Operation of K2 applies a ground thru SW1 which is now up, to the "Reverse" winding of MX causing the carriage to return to home. Simultaneously, operation of K2 causes K2 to lock-in through the ground afforded by SW1 although K5 may have deenergized and causes operation of K6 allowing the coin to drop and contact "A" to open. When the carriage returns to home, SW1 is again held down and K2 unlatched.

Operation of K3 causes it to step to its alternate stable condition so that the next selection will take place on the opposite channel (odd or even) and cause MR2 to operate instead of MR1 so that the belt 68 will, on the next playback cycle be drawn back to the original condition.

K1 is now de-energized since MXS is home; K2 is unlatched; K3 is unenergized because K5 is unenergized since the end-pulse has ceased; the coin has dropped and the system is ready for a new selection.

OPERATION OF TRANSCRIBING UNIT

The transcribing unit 120 which is not fully detailed may contain a record signal reproduction unit 120' similar to the playback unit 20 illustrated in FIGS. 1 to 4 except that its output would not only be audible for monitoring purposes during recording therein, but would be connectable to the recording means of the unit 20 by the illustrated pluggable connector CO1 to magnetically transcribe onto the channels of the belt of said playback unit 20. The connection or coupling may also be made by automatic means to be described.

A section of the transcribing unit 120 which will permit automatic transcribing is shown in FIG. 5. Also shown is the auxiliary equipment in the playback unit 20 to facilitate transcribing.

To automatically transcribe locally, the transcribing unit 120 is connected to the playback unit by means of multiple pin connector CO1. SW3 is thrown "up" to the transcribing position shown. It is assumed that the carriage is home and SW1 is down which provides a ground thru SW3 to K4 which becomes energized. As K4 becomes energized, the bus to which the push button switches PB are in series with "A" becomes grounded and thereby simulates the start condition (i.e. coin deposited and push-button depressed). Also as K4 is operated, selector switch K7 steps to the first position and thereby simulates a selection of the first channel by grounding the first segment of 176. As the sequence of operation of the playback unit begins, the carriage moves off "home" releasing SW1. This removes the original ground which operated K4. However K4 is slow to release so that it remains energized until SW1 has transferred and now supplies a ground for K4 thru the contact of K2, pin 3 of CO1 and contacts of K4. K4 now remains energized for the duration of one transcription.

When K4 is actuated, another set of contacts causes the transcriber motor MT to start, driving a recording medium such as a single channel magnetic tape containing a series of the desired record signals spaced apart thereon such that sufficient time intervals are allowed for carriage travel and tape runout from the end of each recording to the end of the tape. At the time of said tape 68 runout, when K2 is energized, K4 becomes deenergized thereby opening the circuit to MT and causing it to stop. Automatically when the carriage in unit 20 returns to home, the cycle is repeated until all signals reproduced from 120' are recorded. When the carriage returns home after recording the last signal, a ground is again provided to energize K4 which again steps K7. However, the next step on K7 shown as line 122, causes K4 to deenergize thereby discontinuing all action and bringing the cycle to a stop. When SW3 is returned to its normal position for playback, K7 is released returning to home.

Although not shown, in another form of the transcribing unit, closures similar to those of the pushbutton switches PB and "A" of the illustrated playback unit 20 may be incorporated into the transcribing unit 120. They may be operated by means of additional contacts on K4 and another bank of contacts on the minor switch K7 to select the recording to be played back therefrom for transducing onto selected channels of unit 20.

*Remote Transcribing*

Transcribing need not be performed locally at the illustrated reproduction apparatus. By the provision of modified transcribing apparatus including a receiving and relay unit 220 at said reproduction apparatus as shown in FIG. 6 with reference to FIG. 5, and by replacing the switch SW3 with a relay operated switch KSW3, transcribing may be performed from a remote location or master broadcast station to one or a multiple of the record playing units by short wave, over telephone lines, VHF, etc.

For remote transcription control, a momentary tone is sent out from a master station and received at one or more locations each containing a recording device of the type illustrated or the like. This tone causes coil KT1*a* of a tone responsive relay in a control receiver 222 in 220 to become energized which causes its contacts to become latched either mechanically or electrically in the position whereby the relay KSW3 is energized (i.e. units 220 and 20 at the remote station are conditioned for transcribing). A second momentary control tone is then sent out by a signal generator 232 at the control or master station 230 and is received by control receiver 222 which causes another set of contacts in tone responsive relay KT1*b* to close which energizes relay K8 long enough to energize K4 so that it may start the mechanism and latch-in as before. The reason for the addition of relay K8 in the remote transcribing unit control section 220 is described as follows: Without relay K8, the end of a transcription would cause SW4 and K2 to be activated, the carriage to home and K4 to release. Immediately upon the carriage 162 returning home, the cycle would be reinitiated due to the activation of SW1 and K4. If remote transcribing is to be performed simultaneously at various locations, the time at which SW1 is activated, and therefore the time at which a new transcription would start, would not necessarily be the same due to variations in the characteristics of the drives, motors, etc. Since this may be a cumulative difference, the circuit between SW1 and K4 is kept open by means of K8 for a period of time sufficient for all carriages to home after which a pulse is sent out by the master station to restart transcribing. The record signal to be transcribed onto the channel of the tape, against which the recording head is riding and which is travelling in the forward or transcribing direction, is then transmitted and received by the program receiver 224 in unit 220. The program receiver in this case, feeds the recording head in circuit with the output of 224.

The master station 230 includes a signal transmitter 235 such as a conventional radio transmitter if short wave is employed or the proper amplifier if transmission is by telephone line and a signal generator 232 which may be similar to the tape recorder 120' save that it is manually started by a manual switch 233 and stopped either manually or by automatic means at the end of the transcribing cycle. Recorded on the recording medium or tape of 232 are said individual record signals plus the mentioned control tones for sequentially energizing KT1*a* and KT1*b* which are properly time spaced relative to the record signals recorded therein to account for carriage travel and the different signal recording and tape runout times of the recording unit or units 20. The program receiver 224 and control receiver(s) 222 may be kept in operating condition at all times or may be provided with a switch 226 to be manually operated by a person at the recording unit 220 at a known time in advance of the transmission of said signals from the master station 230. If telephone lines are utilized for signal transmission from the master station to the local station unit 220 the switch 226 may be replaced by a relay switch which is responsive to the ring signal of the telephone line whereby a coupling or connection is made between the transmitter 235 of the master station 230 and said receivers 222 and 224 after the initiation of said phone line ring signal by the operator, by dialing or other automatic means. Transcription may be effected at night-time when the load on the phone lines is at a minimum or AM and FM radio channels are at minimum usage, and noise is at a minimum.

The transcribing of new record signals by the methods of FIGS. 5 and 6 may also be effected at hi-speed instead of the normal "playback" speed, using the same tape drive motors provided for playback, by switching from the normal speed control wires to the high speed control wires. In this particular method of "fast" transcribing a modified switch SW3 would be used to effect this transfer (i.e. SW3 instead of being the illustrated double pole double throw (2 Form C) switch would have 2 Form C plus 2 Form A contacts. The 2 Form A contacts would be used to short the normally open contacts of K5 thereby locking the connections for the tape drive motors MR1 and MR2 in the hi-speed conditions.

FIG. 7 is a block diagram showing control and switching means for automatic communication between recording machines including means for automatically transcribing record signals as described, over public or private telephone lines. Block notation form is resorted to for providing a simplified diagram. The system of FIG. 7 is particularly applicable to record signal recording as provided in FIGS. 5 and 6.

The numeral 100 refers to a master signal transmitting and control station comprising a record playback or reproducer unit 101 having a recording medium such as a closed loop tape 102 on a conventional tape transport driven by a constant speed motor MT1 and having a reproduction transducer and pick-up head 103 for reproducing signals recorded on said member 102. The numeral 110 refers to a clock operated switch or timer adapted to complete a circuit between the drive means MT1 for the transport of 101 and a power supply at any preset time. In the application of this system for rejuvenating or changing music record signals in juke boxes or the like located remote from the master station 100, the timer 110 would preferably be preset to start said transcribing action during the early morning hours such as between three and six a.m. when the juke box is not generally used and the load on telephone circuits is at a minimum. The timer switch 110 is preferably of the type which will maintain not only said power circuit to the drive means MT1 for the tape transport 101 for the period necessary to complete a transcription cycle of the desired number of record signals but, although not illustrated, also completes circuits between power means and the necessary amplifying and switching means associated with 101 and the devices illustrated. After starting the tape 102 in motion the signals recorded thereon and reproduced by pickup head 103 are used to effect all control thereafter by completing a communication link between the output of the transducer 103 and transcribing means at one or more remotely situated stations each containing a recording mechanism as described or the like. The output of 103 is passed to a multi-output transformer 103', after being amplified, having multiple outputs **104*a*, 104*b*, 104*c*, etc. each to a different switching unit, one of which (105*a*) is illustrated as connected to the circuit 104*a*. The switching units 105 link the respective outputs of 103' with respective telephone circuits. The circuit 106*a* connects the input 104*a* to 105*a* with a conventional dial-pulse operated telephone switching system designated by the notation 107. The numerals 107*a*, 107*b*, 107*c*, etc. refer to lines in the telephone system extending to respective sub-stations 100*a*, 100*b*, 100*c*, etc. thru the switching system 107**. A recording unit and the necessary transcribing apparatus as described is situated at each of the sub-stations or remote locations.

The first signals reproduced from the tape 102 by head 103 include one or more tone signals each of a different characteristic and each reproduced just prior to a respective pulse train for connecting a respective one of the outputs of 103′ with a respective circuit from 107. For example, the first signal reproduced from 102 may be a tone signal to which only a first relay T10 in the switching unit 105*a* is responsive. The relay T10 is adapted when so energized to actuate a bi-stable switch SW10 to close and complete a circuit between the input line 104*a* and a telephone line 106*a* connected to the switching system 107. Since T10 is the only relay in the system of telephone line connection switches 105 which is responsive to said first tone signal, only the line 104*a* will have been connected to an output circuit 106*a*. Thus the pulse train next reproduced and provided at the output of 103′ will pass over the single circuit 106*a* to the switching system 107. The pulse train may be similar to the train of pulses generated when a telephone number is dialed and completes a circuit thru the switching system 107 with the input line 107*a* to the selected sub-station 100*a* over which a ring signal is generated.

The ring signal is passed to a relay TR which is energized thereby and closes a bi-stable switch SW11 to complete a circuit between the phone line 107*a* and a line 108 extending to a second switch SW12 and to two tone operated relays T2 and T3. The numerals 114 and 115 refer respectively to the switching units containing the bi-stable relay operated switches SW11 and SW12. Like the unit 105*a* and the other switching units of the phone line connecting switches of the group designated by the general notation 105, said control units 114 and 115 may be of several designs of electromechanical or purely electronic nature. In a simple form, the ring responsive relay TR may energize a mono-stable solenoid closing SW11 which may be a conventional bi-stable snap action mechanical switch. The tone operated relay T4 in the unit 114, when energized by a signal reproduced from 101, actuates a solenoid tripping the switch SW11 to open. In a similar manner, the switch SW12 is first closed by a relay T2 responsive to a tone transmitted from 101 and opened when a relay unit T3 becomes energized. The switching unit 115 is provided in the event that a circuit should be completed between 107*a* and 108 by a switching error in the system 107 or the dial selection of said circuit by error by manual or other means not associated with the apparatus at the transmitting station 100. After reproduction of the selection pulse train to the switching system 107 which results in the completion of a circuit between the line 104*a* and 108 of unit 100*a*, a second tone signal may be reproduced from tape 102 by 103 for actuating another relay in one of the output circuits 104*b*, 104*c*, etc. of 103′ which completes a circuit with said second output circuit by the means of 105*a* and another telephone line of the group 106 and the switching system 107. This second tone would be followed by a second pulse train for connecting said second completed circuit (106*b* for example) with a circuit (107*b*) to a second sub-station (100*b*). In this manner, any of the multiple receiving sub-stations may be selectively connected to the output of the transcribing reproduction unit 101 (i.e. by recording and reproducing in tandem order signal groups each comprising a tone or code signal followed by a respective pulse train comprising a digital number equivalent to the number of the circuit being selected).

After all input circuits, equivalent to 108 of station 100*a*, are completed as described, a tone signal is reproduced from 102 and transmitted thru 103′ to each input to which relays in each sub-station equivalent to T2 of 115 are responsive thereby completing the circuit in each sub-station between the recording means of each and the output of the transducer 103 of master station 100. This tone signal is recorded at a position along the constant speed driven tape 102 whereby it will be produced at a time (after the reproduction of the last signals therefrom for completing the last selected circuit) such that the switching system 107 may respond to all signals and effect all circuit connections. The operation of unit 100*a* will be described hereafter and it is assumed that similar control actions occur essentially simultaneously in the other receiving sub-stations selected for transcribing by the signals reproduced from the master station tape 102. The solenoids energized by relays T2 and T3 of 115 are also mechanically associated with a second switch 112 which is a double throw, bi-stable switch actuatable to close when T2 is energized and open when relay T3 is energized. Closing of 112 completes a circuit between a power supply and MT2, the motor means driving tape 68 of the recording unit 20*a* past a recording transducer 111 connected to the input line 108 thru a line 109 and closed switch SW12. The next signal reproduced from 102 is a record signal which is transduced thru 111 onto tape 68. If the recording unit 20*a* is similar to that of FIGS. 1 to 4 and the control system therefor (designated as 113 in FIG. 7) similar to that of FIGS. 5 and 6, then the energizing of switch 112 merely provides a signal to energize KSW3 (ref. FIG. 5). Reference is made to FIGS. 5 and 6 for the automatic control actions occurring thereafter for effecting the movement of the transducing means and the recording means in the unit 20*a*. After the last record signal has been reproduced from 102, a tone signal is reproduced and transmitted to all receiving stations. In the unit 100*a*, this tone signal energizes relay T3 which opens the circuit between 108 and 109 and opens the switch 112 (i.e. SW12 and 112 may be combined in a multi-pole, double throw switch). Another tone reproduced thereafter from 102 unlatches all input relays or disconnects the inputs to each selected station. In FIG. 7, the tone energizes relay T4 opening switch SW11. Still another tone transmitted next automatically disconnects the lines 104 from the telephone lines 106. In FIG. 7 the unit 105*a* has the relay T5 energized which opens switch SW10. Shortly thereafter the clock operated switch 110 opens, stopping the motor MT1 and completing the transcribing cycle. A signal reproduced from 102 may also be used to shut down the apparatus.

In an alternate form of control, the mentioned tone operated relays for connecting and opening the various described circuits, may be replaced by coded relays each responsive to a respective pulse code reproduced from 102 in place of the mentioned tone signals.

I claim:

1. An automatic recording and reproduction system comprising in combination, a plurality of record playing units situated at different locations in said system remote from each other, each of said record playing units having means for the selective playback of one or more of a plurality of record signals from a magnetic recording means thereof, said record signals being recorded on parallel plural recording areas of said magnetic recording means, automatic control means for simultaneously effecting the erasure and changing of record signals recorded on each magnetic recording means of each of said units, means for generating control signals and said record signals at a master station and for transmitting said signals simultaneously therefrom to all of said record playing units, record transcribing means at each of said recording units including a record signal input means at each unit which is operatively connectible to a recording transducing means thereof thru a relay operated switching means, each of said relay switching means of each record playing unit being responsive to a first control signal transmitted from said master station to said units prior to the transmission of said record signals, said relay switching means adapted when actuated to complete respective circuits between said record signal inputs and said transducing means of each unit for passing record signals received thereby to said transducing means, means in each unit for operatively connecting said record signal input and said recording transducing means thereof for recording onto each of said recording areas of said magnetic recording means in a predetermined order as said magnetic recording means is driven past said transducing means, a stepping means in each record playing unit adapted to operate automatically after the start of a transcribing cycle to cause said transducing means thereof to be automatically positioned relative to respective recording areas of said magnetic recording means and to maintain each of said positions during the transmission thereto of a respective record signal whereby to effect the recording of each of said record signals onto respective areas of each of said recording means of said recording units.

2. An automatic recording and reproduction system for simultaneously changing a plurality of recordings in the form of record signals of different time durations in multiple record playback devices such as coin operated selection record players or the like which are situated at different locations apart from each other, comprising in combination with said playback devices, a master station adapted with signal means for controlling and effecting said recordings, said master station including means for tandemly generating in a predetermined order a series of record signals and control signals, in predetermined time relation to the generation of a plurality of said record signals, said control signals adapted to effect the control of a transcribing cycle which includes the recording of multiple of said record signals onto predetermined recording areas of magnetic recording means in each of said record playback devices after the erasure of prior signals therefrom, each of said record playback devices having a transducing unit including magnetic erasure, reproduction and recording means provided on a mount, a servo means for moving said mount relative to said magnetic recording means and stoppable under automatic control adjacent a selected magnetic recording area thereof for transducing relative thereto, each of said record playback devices having transcribing control means including a first control relay responsive to a first of said control signals which has characteristics other than said record signals and is adapted for transmission from said master station to an input to said first relay prior to the transmission of a first of said recordings from said master station, said first relay when actuated by said first control signal adapted to actuate an automatic sequential control means for controlling the operation of said servo means driving said transducing unit to a position adjacent a first of said recording areas of said magnetic recording means, said sequential control adapted thereafter for operatively connecting the recordnig means of said transducing unit with an input from said master station for transcribing and for starting and driving a servo means adapted for moving a first recording area of said magnetic recording means respectively past said magnetic erasure and said magnetic recording means, said signal generating means at said master station adapted thereafter to reproduce a first record signal and to transmit said signal to receiving means at each of said sub-stations at a time after the transmission of said first control signal such that said transducing means will have been moved and positioned for transcribing record signals near the beginning of each predetermined recording area while said transducing means is stopped and shortly after the start of said motor driving said recording means, said first signal also adapted to operatively energize said erasure means so that when said erasure means is brought against said recording means it will erase all prior signals and noise from said recording means, said automatic transcribing control means including means at each record playback unit for automatically positioning said recording transducing means relative to different recording areas of each recording device in a manner such that movement of the transducing means of each unit is effected substantially in unison with minor variations in each due to inherent differences in their mechanisms accounted for in the timing of the transmission of the record signals from said master station and each record signal is recorded in its entirety on a respective recording area of the magnetic recording means of each unit with the beginning of each recording occurring near the first part of each recording area to pass said recording transducer.

3. An automatic recording and record playback system comprising in combination, a plurality of record playing units each having an erasable magnetic recording means having a plurality of magnetic recording areas or tracks, magnetic reproduction and recording transducing means movable relative to said magnetic recording means, each of said transducing means being movable thru a plurality of predetermined paths, an automatic control means for controlling said transducing means in a manner such that said transducing means is positioned relative to each of said tracks for the reproduction of a record signal recorded thereon or the recording of a new record signal on said tracks, each of said transducing means being operatively positionable against said recording means, said automatic control means including a sequential switching means in each record playback unit which is interlocked to operate with the movement of said transducing means for controlling the further movement of said transducing means thru predetermined paths to each of said tracks in a predetermined sequence of motions and the movement of said magnetic recording means past said recording transducing means, a magnetic erasing means adapted to be automatically energized during transcribing to erase all prior signals from said recording means, said recording transducing means adapted to remain in operative engagement with said magnetic recording means while the entire length of each track is driven past said record transducing means, means for stopping said recording means when the end of a recording track thereof has approached the said transducing means, said stopping means including a switch adapted to become energized upon the approach of a predetermined length of said magnetic recording means to said transducing means, and to initiate when so energized a new recording cycle by controlling the movement of said transducing means to a home-position, further switching means at said home-position, a sequential switching means actuated by the movement of said transducing means to said home-position, said sequential switching means thereafter adapted to control the motion of said transducing means to another track and to repeatedly operate as described in further controlling the movement of said transducing means from one track to the next until predetermined of said tracks have been scanned by said transducing means, means for generating and transmitting a plurality of record signals to selected of said recording units during the intervals said transducing means are operatively engaging respective tracks of said magnetic recording means, said record signal transmitting means being located remote from each of said record playing units and including a signal generator with a plurality of said recordings provided therein, means for reproducing said record signals from said signal generator at time intervals after the start of a transcription cycle such that each is recorded on a different recording area of said plural recording tracks of each record playing unit thru said recording transducing means after it is positioned adjacent each track and said recording means has been started in motion, conducting means for operatively connecting said signal generating means to selected of inputs to respective of said record playing units, said conducting means comprising an automatic telephone switching system including terminal circuits thereof connectable to the inputs to each of said recording units and having means for making selected of said connections prior to the generation and transmission thru said system of said record signal.

4. A control system for the automatic communication between transcribing devices comprising in combination, a first of said transcribing devices having means for the automatic transmission to a second transcribing device of a plurality of signals which include a first group of plural control signals followed by plural record signals which are automatically generated thereafter by a signal generating unit at said first transcribing device, said control signals adapted for effecting a communication link between said first transcribing device and an input to a recording means of said second transcribing device, conducting means for the transmission of said signals comprising an automatic telephone switching and connecting system controlled by automatic switching means for effecting said communication link between said devices whereby said first device may transmit thereafter record signals to said recording means of said second device, said switching means being responsive to conventional dial generated switching signals or the like, which comprise chains of digital signals adapted to effect part of the connection of said communication link by the completion of a circuit to a conventional terminal line of said system which results in the generation of a ring signal on said input to said second device, a first relay connected to said input which is responsive to said ring signal and is adapted, when energized thereby, to complete a circuit to the energizing input of a second relay which is responsive to a further signal, a first relay at said first transcribing device adapted for connecting the output of said signal generating means thereof with a telephone line output to said switching system, said first transcribing device first relay being responsive to a first signal transmitted from said signal generating means which when energized thereby is adapted to connect the output of said signal generating means to said switching system, said signal generating means being adapted thereafter to generate and transmit selection pulse trains over the line to said switching system which are adapted to automatically effect the completion of said link to said recording device of said second transcribing device, said automatic switching system adapted to effect a ring signal on the terminal circuit of said second transcribing device whereby to energize the first relay thereof, said signal generating means adapted thereafter to transmit a further signal which is adapted to energize said second relay at said second transcribing device which is adapted upon becoming energized thereby to complete a circuit between said signal generating means and transducing means at said second transcribing device and to actuate means for driving a recording means thereat relative said transducing means, said signal generating means adapted thereafter to transmit a record signal over said completed circuit of said automatic switching system for energizing said transducing means and for recording said signal onto said recording means, said signal generating means adapted upon completion of the transmission of said record signal to said recording means to transmit signals on its output for effecting the automatic disconnection of said circuit by energizing relay means adapted to break said circuit.

5. Magnetic recording and reproduction apparatus for the playback of selected of a plurality of record signals recorded therein, said apparatus comprising in combination a recording device including a recording and reproduction flexible magnetic recording means having a plurality of record tracks spaced apart from each other and adapted to be simultaneously driven past a reproduction transducer movable into operative position with respect to said recording means and adapted for reproducing said signals therefrom, each of said tracks being substantially of the same length, means for moving said transducer, means for automatically selectively positioning a record playback head of said transducer adjacent a selected track of said magnetic recording means for reproducing therefrom, dual-speed drive means for driving said flexible recording means past said reproduction transducer, control means for starting said drive means to move said flexible magnetic recording means at first speed when said transducer is positioned adjacent a selected track for reproducing therefrom the signal recorded thereon, an end-of-record indicating signal recorded on each track at the end of each record signal thereon, said end-of-record signal having a characteristic such that when reproduced therefrom it will not be audible through a playback speaker of said apparatus, a relay means in the output of said reproduction transducer which is responsive to said indicating signal, said relay means adapted when energized thereby to switch said drive means for said tape to a second speed which is greater than said first speed to more rapidly run out the remainder of said record track and means for stopping said drive means when the position of the beginning of the signals recorded in the opposite direction on an adjacent track of said flexible magnetic recording means is near said transducer; means for transmitting and recording predetermined record signals onto predetermined tracks of said magnetic recording device from a remote transmitting station, said last recited means comprising a signal generating means at said remote station for generating said record signals in a predetermined order, receiving apparatus at said recording device adapted to receive signals generated by said generating means, transmission means linking said generating means and said recording device, said generating means including means for generating multiple control signals for remotely controlling recording, relay means in said recording device responsive to said control signals for controlling said drive means for said recording means to start and stop at predetermined times prior to and after each record signal is transmitted to said recording device whereby different record signals are recorded on different of said plural recording tracks.

6. A magnetic record transducing arrangement comprising a magnetic recorder and reproducer device including recording means having a plurality of magnetic recording tracks, transducing means movable into operative position with respect to said recording means for recording signals on said tracks, automatically operative means for controlling the movement of said recording means and the recording of a plurality of selected signals on different predetermined tracks of said plurality of tracks, means for gating predetermined parts of an input through said transducing means to predetermined of said plurality of tracks, means for generating a plurality of record signals at predetermined time intervals with sufficient time delay between the generation of each signal to permit said transducing means to return to a predetermined position after transcribing information on one of said plurality of tracks, means operatively associated with said signal generating means for transmitting the output of said signal generating means to the input of said transducing means, said control means including means for synchronizing movement of said recording means with an output of said signal generating means whereby predetermined signals produced by said signal generating device are recorded on different tracks.

7. A selection record player having signal recording means including a plurality of tracks of substantially similar length, a signal transducing means adapted for recording and reproducing signals on said tracks, means for simultaneously moving all of said tracks relative to said transducing means, a signal generating means including a transcribing device having means for automatically reproducing a series of record signals in succession at an output thereof connectable to said transducing means, switching means for connecting said output of said transcribing device to said transducing means, servo-motor driven conveying means for positioning said transducing means relative to predetermined of said tracks, means for controlling the motion of said conveying means to position said transducing means relative selected of said tracks, said last recited means including a relay means responsive to control signal means produced by said transcribing device in predetermined time relation to the reproduction of record signals therefrom such that said conveying means moves said recording transducer to a position for recording on a first of said tracks prior to the reproduction of a first record signal from said transcribing device and said track driving means starts said track in motion prior to the reproduction of the first signal from said transcribing device, means for automatically stepping said conveying means to position said transducer relative to a selected one of said tracks after each of said record signals is recorded.

8. Magnetic recording and reproduction apparatus for the playback of selected of a plurality of record signals recorded therein comprising a recording device including recording means having a plurality of record tracks spaced apart from each other and adapted to be simultaneously driven relative to a reproduction transducer movable into operative position with respect to said recording means and adapted for reproducing said signals therefrom, each of said tracks being substantially of the same length, means for moving said transducer, means for automatically selectively positioning a record playback head of said transducer adjacent a selected track of said magnetic recording means for reproducing therefrom, dual-speed drive means for driving said flexible recording means past said reproduction transducer, control means for starting said drive means to move said recording means at first speed when said transducer is positioned adjacent a selected track for reproducing therefrom, an end-of-record indicating signal recorded on each track at the end of each record signal thereon and having a characteristic such that when reproduced it will not be reproduced as an audible signal, a relay means in the output of said reproduction transducer and responsive to said indicating signal, said relay means when energized switching said drive means to a second speed which is greater than said first speed to more rapidly run out the remainder of said record track, means for stopping said drive means when the position of the beginning of the signals recorded in the opposite direction on an adjacent track of said flexible recording means is near said transducer.

9. The apparatus of claim 8 in which the recording means comprises a belt operably movable between two spaced-apart reels in a manner to wind onto one of said reels while uncoiling from the other, two adjacent tracks defining a pair, one track of the pair having the same record signal in reverse directions as the other track of the pair, said belt adapted to be driven during the reproduction of a selected of said record signals therefrom through essentially its complete length first in one direction during the next playback cycle, the starting points of all of said record signals which are recorded in one direction on said belt being located thereon at substantially the same lateral position of said belt, said record signals ending at different lateral positions of said belt.

10. In a recording system having an elongated flexible magnetic recording medium and transport means for moving said medium along its longitudinal axis past a transducing head with said transport means comprising a supply reel and a take-up reel spaced from said supply reel and including means for driving said tape along its longitudinal axis from said supply reel to said take-up reel, the improvement comprising a support means for engaging a portion of said tape on one side of said recording medium, means for tensionally retaining said recording medium against said support as it is driven, a mount to which said head is secured, said mount having a wheel means disposed lateral to said head and adapted for engaging the other side of said recording medium and forcing it against said support means, said wheel means being freely mounted to rotate over said recording medium as the latter is driven past said head whereby said transducing head is precisely positioned relative to said recording medium at the side of said wheel means when engaging said magnetic recording medium for transducing thereto.

11. A magnetic recording device including a base, a pair of spaced apart elongated reels mounted to said base, a relatively wide elongated magnetic recording belt secured at each end to respective of said reels and windable from one to the other, motor operated reversible drive means for rotating said reels thereby driving said belt, control means including means for starting said reversible drive means, magnetic transducing means including a plurality of transducer heads mounted on a carriage which is movable into operative position with respect to said recording belt, a track supported by said base for guiding said carriage in travel parallel to an unsupported section of said belt between said reels, said belt being of sufficient length between said reels to permit said plurality of transducer heads to engage said belt in light tension, servo drive means mounted on said carriage for urging said heads against said unsupported section of said belt whereby magnetic transducing may be effected between the two, said transducing means comprising at least two arrays of magnetic transducing heads each mounted on a respective common base, a plurality of lineal servo means adapted when energized to project respective of said transducer arrays from a retracted position on said carriage to a position wherein the heads thereof are in engagement with the unsupported section of belt, the heads of a first of said arrays arranged to respectively perform the transducing functions of erasure, recording and reproducing from odd tracks of said belt when it is travelling in a first direction past said heads such that said belt passes said heads in a manner whereby all prior recorded signals on a track may be erased therefrom before recording a new signal therefrom for monitorizing purposes, said other array of transducing heads provided adjacent said first array in an arrangement whereby they may perform said transducing functions in the same order on even tracks of said belt when it is driven in the reversed irection, input and output signal conducting means operatively connectable to each of said transducing heads through a switching means, said switching means being interlocked to control means adapted for changing the direction of said reversible drive means whereby the heads of one array of said transducers are connected to said output signal conducting means when the magnetic tape is travelling in one direction and the heads of the other array are not connected thereto until the magnetic belt is travelling in the opposite direction.

12. A magnetic recording device including a base, a pair of spaced apart elongated reels mounted to said base, a relatively wide elongated magnetic recording belt secured at each end to respective of said reels and windable from one to the other, motor operated reversible drive means for rotating said reels thereby driving said belt, control means including means for starting said reversible drive means, magnetic transducing means including a plurality of transducer heads mounted on a carriage which is movable into operative position with respect to said recording belt, a track supported by said base for guiding said carriage in travel parallel to an unsupported section of said belt between said reels, said belt being of sufficient length between said reels to permit said plurality of transducer heads to engage said belt in light tension, servo drive means mounted on said carriage for urging said heads against said unsupported section of said belt whereby magnetic transducing may be effected between the two, said transducing means comprising an erase head, a recording head and a reproduction head mounted fixed relative to each other on a base, means for rotating said base whereby said heads are moved from a first position in which they are in alignment with a track of said belt when said belt is in motion in a first direction, to a second position whereby said heads are in alignment with an adjacent track of said belt when it is in motion in the opposite direction, control means including a transducer positioning servo means mounted on said carriage for rotating said heads, control means for operating said positioning servo means to rotate said heads to said second position after transducing from one track whereby said erasing head will be the first of said heads to be swept by a point on said belt when travelling in the opposite direction, means for recording multiple record signals each on a respective odd track of said belt and for repeating the recording of each of said signals in the reverse direction on respective even tracks thereof, each signal being adjacent the track having the same recording running in the opposite direction whereby any of said signals may be selectively reproduced from said belt regardless of the direction it is travelling by the rotation of said heads and their prepositioning relative to the respective of said tracks containing said recording provided in the proper direction.

13. A magnetic record transducing arrangement comprising a magnetic recorder and reproducer device including recording means having a plurality of magnetic recording tracks, transducing means movable into operative position with respect to said recording means for recording signals on said tracks, means for controlling the movement of said recording means and the recording of selected signals on predetermined tracks of said plurality of tracks, means for gating predetermined parts of an input through said transducing means to predetermined of said plurality of tracks, means for generating a plurality of record signals at different time intervals with sufficient time delay between each signal to permit said transducing means to return to a predetermined position after impressing information on one of said plurality of tracks, means operatively associated with said signal generating means for transmitting the output of said signal generating means to the input of said transducing means, said control means including means for synchronizing movement of said recording means with an output of said signal generating means whereby predetermined signals produced by said signal generating device are recorded on different tracks, and switching means for initiating and ending each transducing action in response to signals recorded on said signal generating means.

14. An erasable record transducing arrangement comprising a recorder and reproducer device having transcribing means including movable flexible recording means having a plurality of erasable recording channels, transducing means movable into operative position with respect to said flexible recording means for recording signals thereon, a first means for moving said transducing means from a position opposite one of said plurality of channels to a position opposite any other of said plurality of channels, automatic control means for controlling the movement of said transducing means and for controlling the recording of selected signals on predetermined channels of said plurality of channels, a signal generating device having multiple recordings provided therein, a second means constructed to reproduce recordings from said signal generating device in a predetermined sequence, third means operatively connected to said second means for transmitting the output thereof to the input of said transducing means, said control means including means for synchronizing movement of said transducing means with the output of said signal generating means and the movement of said flexible recording means whereby predetermined signals produced by said signal generating device are recorded on different channels.

References Cited in the file of this patent

UNITED STATES PATENTS

| | | |
|---|---|---|
| 2,200,351 | Whitehead | May 14, 1940 |
| 2,224,244 | Hicks | Dec. 10, 1940 |
| 2,321,944 | Sanders | June 15, 1943 |
| 2,385,968 | Deakin | Oct. 2, 1945 |
| 2,391,246 | Kenny | Dec. 18, 1945 |
| 2,396,409 | Berger | Mar. 12, 1946 |
| 2,431,646 | Kenney et al. | Nov. 25, 1947 |
| 2,481,398 | Danisch | Sept. 6, 1949 |
| 2,514,578 | Heller | July 11, 1950 |
| 2,680,785 | Franklin | June 8, 1954 |
| 2,772,135 | Hollabaugh et al. | Nov. 27, 1956 |
| 2,821,576 | Gaubert | Jan. 28, 1958 |
| 2,831,180 | Hasbrouck | Apr. 15, 1958 |
| 2,832,841 | Eldridge | Apr. 29, 1958 |
| 2,852,761 | Hagopian | Sept. 16, 1958 |
| 2,908,767 | Fritzinger | Oct. 13, 1959 |

FOREIGN PATENTS

| | | |
|---|---|---|
| 701,552 | Germany | Jan. 18, 1941 |